(12) United States Patent
Zhang et al.

(10) Patent No.: US 8,730,806 B2
(45) Date of Patent: May 20, 2014

(54) CONGESTION CONTROL AND RESOURCE ALLOCATION IN SPLIT ARCHITECTURE NETWORKS

(75) Inventors: Ying Zhang, San Jose, CA (US); Neda Beheshti-Zavareh, San Jose, CA (US)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 256 days.

(21) Appl. No.: 13/438,631

(22) Filed: Apr. 3, 2012

(65) Prior Publication Data

US 2013/0258847 A1    Oct. 3, 2013

(51) Int. Cl.
*H04L 12/26* (2006.01)
(52) U.S. Cl.
USPC .......................................................... 370/232
(58) Field of Classification Search
USPC .......................................................... 370/232
See application file for complete search history.

(56) References Cited

U.S. PATENT DOCUMENTS

| | | | | |
|---|---|---|---|---|
| 5,381,404 A | * | 1/1995 | Sugano et al. | 370/238 |
| 8,009,560 B2 | * | 8/2011 | Khan et al. | 370/230 |
| 8,432,830 B1 | * | 4/2013 | Banerjee et al. | 370/254 |
| 8,493,860 B2 | * | 7/2013 | Racz et al. | 370/235 |
| 8,644,149 B2 | * | 2/2014 | Yedavalli | 370/231 |
| 2008/0181111 A1 | * | 7/2008 | Felter et al. | 370/232 |
| 2013/0176849 A1 | * | 7/2013 | Csaszar et al. | 370/232 |

OTHER PUBLICATIONS

Othaman, et al., "Design and Implementation of Application Based Routing Using OpenFlow", Proceedings of the 5th International Conference of Future Internet Technologies, CFI '10, New York, New York, (2010), 8 Pages.

Allman, "TCP Congestion Control; RFC 2581; http://www.ietf.org/rfc/rfc2581.txt; Apr. 1999", 14 pages.
Brunner, M., et al., "Probablistic Decentralized Network Management", in Proceedings of the 11th IFIP/IEEE International Conference on Symposium on Integrated Network Management, IM'09, pp. 25-32, 2009.
Demers, A., et al., "*Analysis and simulation of a fair queueing algorithm*," in SIGCOMM 89: Symposium proceedings on Communications architectures & protocols. New York, NY, USA ACM, 1989, pp. 1-12.
Handley, M., et al., "*TCP congestion control*" RFC 3448, 1999, 24 pages.
Mckeown, N., "OpenFlow: Enabling Innovation in Campus Networks", ACM SIGCOMM Computer Communications Review; vol. 38, No. 2, Apr. 2008, pp. 69-74.

* cited by examiner

*Primary Examiner* — Hassan Kizou
*Assistant Examiner* — Abdullahi Ahmed
(74) *Attorney, Agent, or Firm* — Blakely, Sokoloff, Taylor & Zafman, LLP (57) ABSTRACT

A controller performs network-wide congestion control in a split architecture network. The controller receives flow statistics from switches for each entity that communicates via the network. The controller chooses a most congested link as a bottleneck link based on a packet loss rate that is derived from the flow statistics and estimated for each entity on each link of the network. The controller identifies a target path in the network that passes through the bottleneck link and carries the most traffic, and calculates a throttling probability for each sharing entity that shares the target path based on the capacity of the bottleneck link, capacity of the first link of the target path, bandwidth consumption and packet loss rate of each sharing entity. The controller then transmits the throttling probability of each sharing entity to the ingress switch of the target path to reduce the congestion on the bottleneck link.

20 Claims, 6 Drawing Sheets

1: for Every link $l$ in $G$ and statistics in $S$ do
2:    Find $l_b = MAX_l n \times \sum_{i=1}^{n} \frac{L_i^t}{B_i^t}$
3: end for
4: for Every path $p$ traversing $l_b$ do
5:    Find $p_b = MAX_p \sum_{i=1}^{n} B_i^t$
6: end for
7: for Every control entity $i$ in $p_b$ do
8:    $m_i^t = \mu B_i^t + \beta L_i^t$
9:    Compute throttling probability $P_i = \frac{m_i^t}{\sum_{i=1}^{n} m_i^t} \times \frac{\sum_{i=1}^{n} B_i^t - C_b}{C_{tn}}$
10: end for
11: for Every path $\hat{p}$ that shares any link with $p$ do
12:    Update flow statistics on $\hat{p}$
13: end for

FIG. 7

CONGESTION CONTROL AND RESOURCE ALLOCATION IN SPLIT ARCHITECTURE NETWORKS

FIELD

Embodiments of the invention relate to the field of split architecture networks; and more specifically, to congestion control in split architecture networks.

BACKGROUND

Congestion control and resource sharing techniques implemented in today's networks have limited performance and effectiveness. This is mainly because network congestion information is distributed and is based on limited knowledge about the congestion status of the network. Decisions on how to adjust transmission rates are independently made by each node. This independent decision process is the fundamental reason of sub-optimal resource utilization and unfairness experienced by the users.

On the Internet, packet loss can occur as a result of transmission errors, but most commonly as a result of congestion. The end-to-end congestion control mechanism used by Transport Control Protocol (TCP) reacts to packet loss by reducing the number of outstanding unacknowledged data segments allowed in the network. More specifically, TCP flows with similar round-trip times (RTTs) that share a common bottleneck reduce their rates so that the available bandwidth will be, in the ideal case, distributed equally among them. TCP's end-to-end congestion control mechanism, as well as other existing congestion control techniques, control relative flow rates using distributed methods. These distributed methods are designed to achieve certain defined goals, such as flow rate fairness, examples of which include weighted fair queuing, TCP congestion control and TCP-friendly rate control.

However, the distributed methods used in today's networks generally require the cooperation of end hosts. As the decisions are made distributedly by each individual end host (e.g., router), the decisions may sometimes unable to reflect the real-time changing conditions of the networks. Thus, the existing distributed techniques often lead to sub-optimal decisions. Therefore, there is a need for improving the congestion control techniques for large scale carrier networks.

SUMMARY

According to embodiments of the invention, a network element functioning as a controller performs network-wide congestion control in a split architecture network. The network comprises the controller, a set of switches and a set of links with each of the links connecting to two of the switches. Each of the switches forwards flows and collects flow statistics as directed by the controller. The flows traverse across the network via their respective paths formed by the links. A set of entities communicate via the network and each entity is identified as one or more of the flows that traverse a same path in the network. In one embodiment, a network operator has the flexibility to define the term "entity."

In one embodiment, a method performed by the controller comprises: receiving flow statistics from switches for each entity; choosing a most congested link as a bottleneck link based on a packet loss rate that is derived from the flow statistics and estimated for each entity on each link of the network; identifying a target path in the network that passes through the bottleneck link and carries the most traffic; and calculating a throttling probability for each sharing entity that shares the target path based on the capacity of the bottleneck link, capacity of the first link of the target path, bandwidth consumption and packet loss rate of each sharing entity. The controller then transmits the throttling probability of each sharing entity to the ingress switch of the target path to drop packets and to reduce the congestion on the bottleneck link.

In one embodiment, a network element functioning as the controller comprises memory to store flow statistics for each entity; a network interface to receive the flow statistics from the switches; and a processor coupled to the memory. The processor is adapted to: choose a most congested link as a bottleneck link based on a packet loss rate that is derived from the flow statistics and estimated for each entity on each link of the network; identify a target path in the network that passes through the bottleneck link and carries the most traffic; calculate a throttling probability for each sharing entity that shares the target path based on the capacity of the bottleneck link, capacity of the first link of the target path, bandwidth consumption and packet loss rate of each sharing entity; and transmit the throttling probability of each sharing entity to the ingress switch of the target path to drop packets and to reduce the congestion on the bottleneck link.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one. Further, when a particular feature, structure, or characteristic is described in connection with an embodiment, it is submitted that it is within the knowledge of one skilled in the art to effect such feature, structure, or characteristic in connection with other embodiments whether or not explicitly described.

DESCRIPTION OF EMBODIMENTS

In the following description, numerous specific details are set forth. However, it is understood that embodiments of the invention may be practiced without these specific details. In other instances, well-known circuits, structures and techniques have not been shown in detail in order not to obscure the understanding of this description. It will be appreciated, however, by one skilled in the art, that the invention may be practiced without such specific details. Those of ordinary skill in the art, with the included descriptions, will be able to implement appropriate functionality without undue experimentation.

A congestion control mechanism for split-architecture networks is described herein. The split-architecture network described herein includes multiple forwarding elements (i.e., switches, such as OpenFlow switches) controlled by a single centralized controller. The centralized controller oversees the congestion observations and resource consumption in the network. The centralized controller has a network-wide (global) knowledge about the forwarding plane in the split architecture network. The controller gathers traffic statistics (e.g., network performance counters) from the switches and makes intelligent decisions on congestion management in real time, such as which entities/flows should be throttled at what rate. The controller then sends the decisions (as policies) to the switches, and performs dynamic updates to the policies continuously.

The congestion control described herein allows different policies of resource sharing among multiple entities. It takes into account the overall congestion status and traffic load in the network, on all links. It also provides an efficient rate-control mechanism for real-time traffic and non-TCP traffic. As a result, it significantly increases the performance and utilization of network-wide resources. The congestion control can be implemented on an Enterprise network, a single Autonomous System (AS), or a mobile backhaul and mobile core transport network (which belong to an administrative organization).

Embodiments of the invention provide an efficient throttling policy that is applicable to different types of traffic from different entities. The throttling policy controls a flow's network resource consumption according to a definition of fairness chosen by the network operator.

Embodiments described herein intelligently throttle aggressive traffic at the ingress switch of the network, thereby more efficiently utilizing the available bandwidth in the network. Compared to dropping packets at the bottleneck link, the approach described herein frees wasted bandwidth used by the aggressive traffic, on links between the ingress switch and the bottleneck link.

Figure 1:
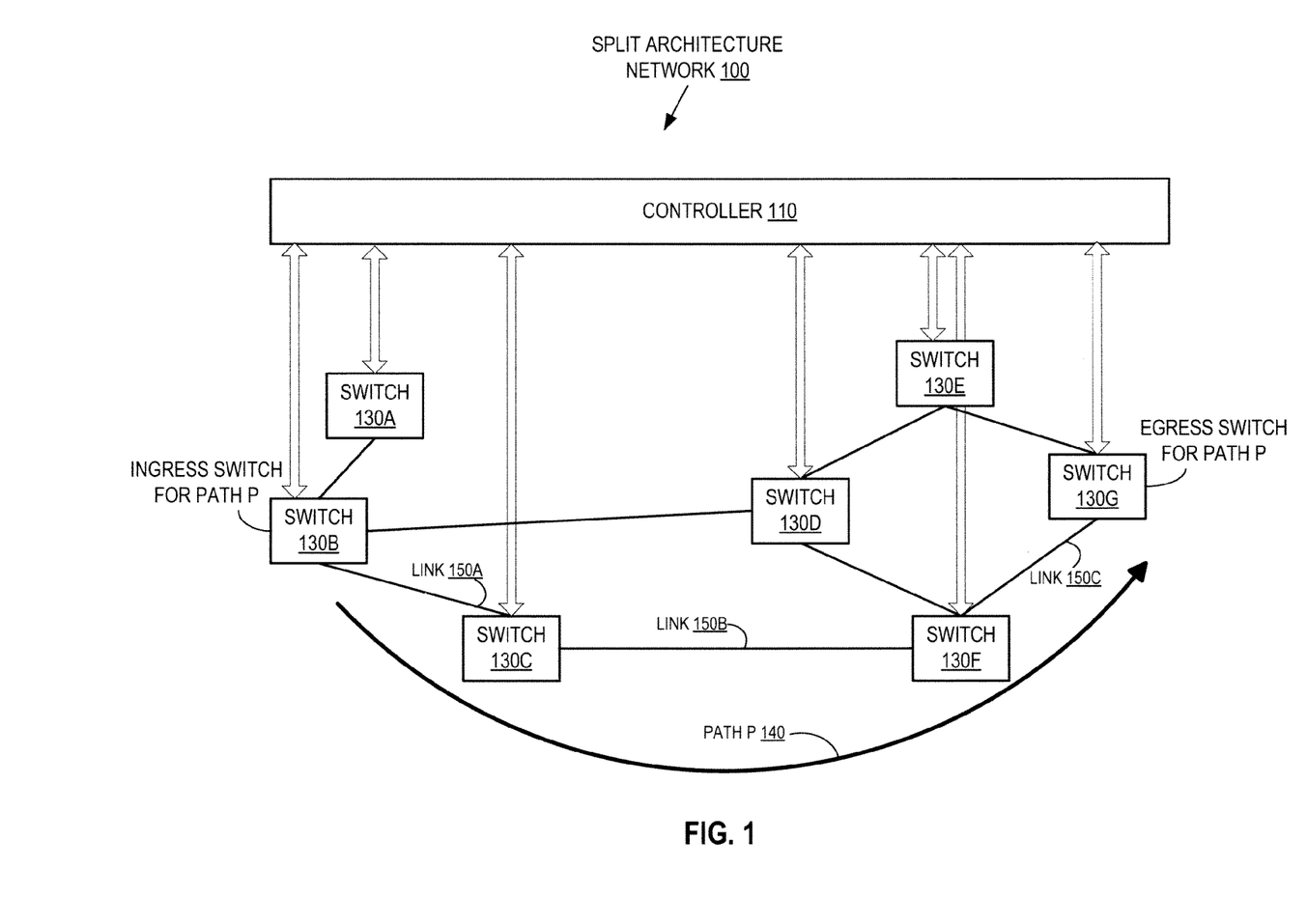
FIG. 1 illustrates an embodiment of a split architecture network in which congestion control is performed.

FIG. 1 illustrates an embodiment of a split architecture network 100 that includes a controller 110 coupled to a set of switches (e.g., switches 130A-G). The controller 110 manages the set of switches 130A-G and defines the interconnection and routing among the switches 130A-G. The controller 110 also handles network state distribution, such as collecting information from the switches 130A-G and distributing routing instructions to the switches 130A-G. The controller 110 can also be programmed to support new addressing, routing, and complex packet processing applications. That is, the controller 110 is the "brain" of the network 100. Each switch 130A-G needs to connect to at least one controller to function correctly. Each switch 130A-G can be connected to a controller directly or through one or more of the other switches 130A-G.

In the example of FIG. 1, when a switch (e.g., any of the switches 130A-G) receives a new flow without knowing where to send the packets of the new flow, the switch forwards a packet of the new flow (e.g., the first packet of the new flow) to the controller 110. Upon receiving the packet, the controller 110 directs the switch regarding where to forward the new flow. The forwarding rule is then installed on the switch to handle future packets belonging to the same flow.

A split architecture network, such as the split architecture network 100, is a distributed system in which the control plane is decoupled from the forwarding plane. The control plane includes a network-wide control platform, such as a small number of controllers (e.g., the controller 110). In one embodiment, the controller 110 may run on one or more servers in the network 100 and instruct the forwarding behavior of a set of simple, interconnected forwarding elements, such as the switches 130A-G. The decoupling of the control and forwarding planes contrasts to the architecture of a traditional router in which the control plane and the forwarding plane are tightly coupled in the same box. The integrated design of the router usually results in overly complicated control plane and complex network management. This complexity of the router creates a high barrier to the development of new protocols and network upgrades. In the traditional network, there is no centralized entity that holds the whole picture of the network.

The network 100 includes a number of paths, each of which is defined by a set of links that connect an ingress switch to an egress switch. For example, a path P 140 is defined by the connection formed by links 150A-C, which connect an ingress switch 130B to an egress switch 130G of the path P 140.

Figure 2:
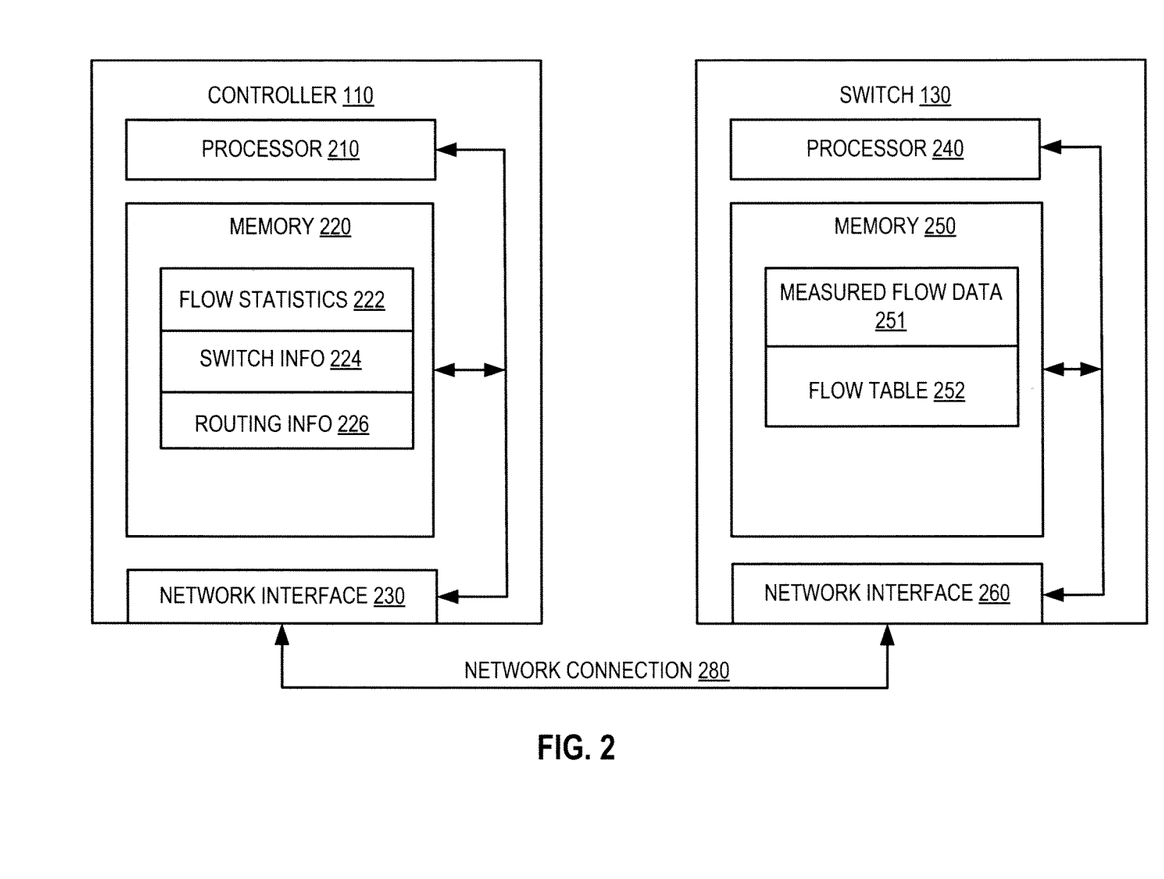
FIG. 2 illustrates an embodiment of a controller and a switch in a split architecture network.

FIG. 2 illustrates an embodiment of the controller 110 and a switch 130 (e.g., any of the switches 130A-G) in the split architecture network 100 of FIG. 1. In one embodiment, the switch 130 functions as a forwarding element that forwards packets from its ingress port to its egress port, according to the rules in a flow table 252 programmed by the controller 110. In one embodiment, the switch 130 includes a processor 240 coupled to a memory 250, and a network interface 260 for communicating with other network elements (e.g., the controller 110 and other switches) in the network 100 via a network connection 280. The memory 250 stores measured flow data 251 and the flow table 252. The measured flow data 251 records the measurement of the flows that are monitored and sampled by the switch 130. The flow table 252 can be programmed by the processor 240, as directed by the controller 110, to record the rules for forwarding packets from its ingress port to its egress port. Each flow entry in the flow table 252 is a rule that contains a set of actions such as forwarding packets to a given port, modifying certain bits in the packet header, encapsulating packets to the controller 110, or simply dropping the packets. For the first packet in a new flow, the switch 130 can forward the packet to the controller 110 to trigger the programming of a new flow entry into its flow table 252. The switch 130 can also forward all of the slow-path packets (such as Internet Control Message protocol (ICMP) packets) to the controller 110 for processing.

In one embodiment, the controller 110 includes a processor 210 coupled to a memory 220, and a network interface 230 for communicating with other network elements (e.g., switches) in the network 100 via the network connection 280. The memory 220 stores flow statistics 222, switch information 224 and routing information 226. The flow statistics 222 contain bandwidth consumption information, packet loss information and other information gathered from the switches managed by the controller 110. The switch information 224 contains link capacity, switch memory size, and other information (or constraints) of each of the switches and the links connecting thereto. The routing information 226 contains the path information among the switches. For example, for each ingress switch and egress switch from which a flow enters and exits the network, respectively, the routing information 226 stores a list of the other switches that form a path between the ingress switch and the egress switch. In one embodiment, the routing information 226 also contains information for keeping track of assigned flows for each of the switches managed by the controller 110.

Before describing the details of the congestion control technique according to embodiments of the invention, it is useful to explain some terminology first.

Flow.

The term "flow" can be defined broadly, e.g., data traffic on a Transmission Control Protocol (TCP) connection, or all traffic from a particular Media Access Control (MAC) address or Internet Protocol (IP) address.

Entity.

An entity is a unit to which the congestion control policy is applied. An entity can be a flow identified by the 5-tuples in the packet header. Alternatively, an entity can be defined as one or more flows coming from or destined for a user, a group of user, a host (identified by a source IP address), a web server (identified by a destination IP address), etc. In one embodiment, network operators can have their own definition of entity. As described herein, an entity may be associated with one or more flows, and all of the flows associated with one entity traverse the same path in the network. Thus, an entity is defined herein as one or more flows that traverse a same path in the network. In one embodiment, a network operator has the flexibility to define the term "entity."

In one embodiment, the operation of the controller includes the following steps: identify the most severely congested link, develop a throttling policy, predict the traffic distribution changes, identify the next most severely congested link, and continue the preceding loop of operations. Embodiments described herein focus one link at a time. This is because the traffic volumes on different links in the network are not independent. For instance, once the throttling policy effectively reduces the traffic volume on the most congested link, traffic on other links may also be reduced. The operation of the controller is described in detail below.

Figure 3:
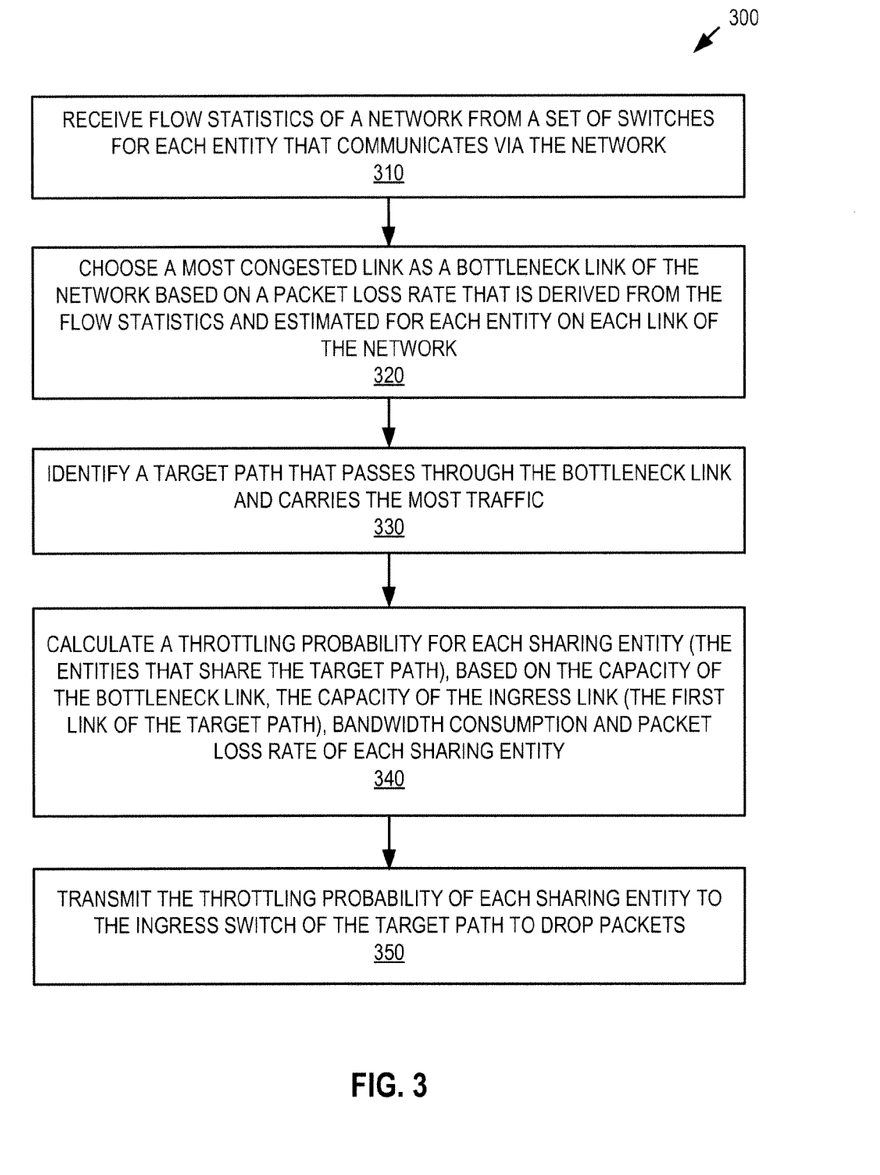
FIG. 3 is a flow diagram illustrating an embodiment of a method for congestion control.

FIG. 3 illustrates an embodiment of a method 300 for congestion control in a split architecture network. In one embodiment, the method 300 can be performed by a controller in a split architecture network, such as the controller 110 in the split architecture network 100 of FIG. 1.

The method 300 begins with the controller 110 receiving flow statistics from the switches 130A-G that it manages (block 310). The flow statistics are associated with a set of entities that communicate via the network. Each entity is identified as one or more flows that traverse the same path in the network. In one embodiment, a network operator has the flexibility to define the term "entity." In one embodiment, the controller 110 collects two types of flow statistics from the switches 130A-G. These two types of flow statistics include: for each entity i, the bandwidth consumption Bi (also referred to as the bandwidth) and the total packet loss rate Li. The bandwidth consumption Bi represents the overall volume of traffic that entity i consumes. The packet loss rate Li represents the amount of congestion caused by the traffic of entity i. The packet loss rate also captures the effect of burstiness of the traffic. For example, a flow can have average low bandwidth consumption but with high burstiness, causing transient congestion on the link.

In some embodiments, instead of receiving the packet loss rate Li from the switches 130A-G, the controller 110 calculates the packet loss rate Li based on the data sent from the switches 130A-G. An embodiment of the method for calculating the packet loss rate Li is described in detail with reference to FIG. 5.

In one embodiment, a sliding window is used to maintain continuous updates on Bi and Li. The updates can be performed by the controller 110 or the switches 130A-G using an Exponentially Weighted Moving Average (EWMA) method:

$$B_i^t = (1-\alpha)B_i^{[t-1,t]} + \alpha B_i^{t-1}; \text{ and}$$

$$L_i^t = (1-\alpha)L_i^{[t-1,t]} + \alpha L_i^{t-1}.$$

Here $B_i^t$ stands for the current bandwidth at time t, $B_i^{[t-1,t]}$ is the average bandwidth from time t-1 to t, and $B_i^{t-1}$ is the bandwidth from the last timestamp when the statistics are collected. The notations $L_i^t$, $L_i^{[t-1,t]}$ and $L_i^{t-1}$ have analogous meaning. The parameter $\alpha$ is a configurable parameter, which balances the weights between the most recent time interval and the past.

The use of the sliding window, in particular the EWMA method, leads to long-term fairness. Information in the statistics includes not only the traffic volume contributed by different entities in the current time window, but also their contributions to the congestion in history.

After receiving the statistics, the controller 110 chooses a most congested link as the bottleneck link of the network based on the packet loss rate that is derived from the flow statistics and estimated for each entity on each link of the network 100 (block 320). In one embodiment, the most congested link among all of the links l in the network 100 is defined as the link that has the most packet loss rate or the most overloaded traffic. According to this definition, the link that satisfies: $MAX_l \Sigma_i^l L_i^t / B_i^t$ is chosen as the most congested link, where for each link l, the summation of relative packet losses of all of the entities using (that is, whose traffic traverses) link l is computed. The term "relative packet loss" is defined as $L_i^t / B_i^t$ for entity i, which is the number of dropped packets over the successfully delivered packets. The link l having the maximum value represents the weakness link in the entire network.

In another embodiment, the link that affects the most entities is defined as the most congested link. The controller 110 computes the number of entities affected on each link, using the metric: $MAX_l((\Sigma_i^l (L_i^t / B_i^t)) \times n)$, where for each link l, the summation of relative packet losses of all of the entities using link l is multiplied by the total number (n) of such entities. This metric captures not only the relative packet loss, but also how many entities are affected.

After identifying the most congested link (i.e., the bottleneck link), the controller 110 further identifies a target path that passes through the bottleneck link and carries the most traffic (block 330). Using the example of FIG. 1, if link 150C is identified as the bottleneck link, the target path is the path that traverses link 150C. If there are multiple paths that traverse link 150C, the path that carries the most traffic is the target path. For example, path P 140, which is from the ingress switch 130B to the egress switch 130G, can be the target path.

After identifying the target path, the controller 110 constructs a throttling policy for each entity that share the use of the target path. These entities are herein referred to as the sharing entities. In one embodiment, the throttling policy is in the form of a throttling probability $P_i$ for each sharing entity i. The throttling probability $P_i$ is calculated by the controller 110 based on the capacity of the bottleneck link, the capacity of the ingress link (which is the first link of the target path), the bandwidth consumption and the packet loss rate of each sharing entity (block 340). Computation of the throttling policy is described in detail with reference to FIG. 6. Subsequently, the controller 110 transmits the throttling probability $P_i$ of each sharing entity i to the ingress switch of the target path (block 350). The ingress switch drops packets belonging to entity i using the probability $P_i$.

Figure 4:
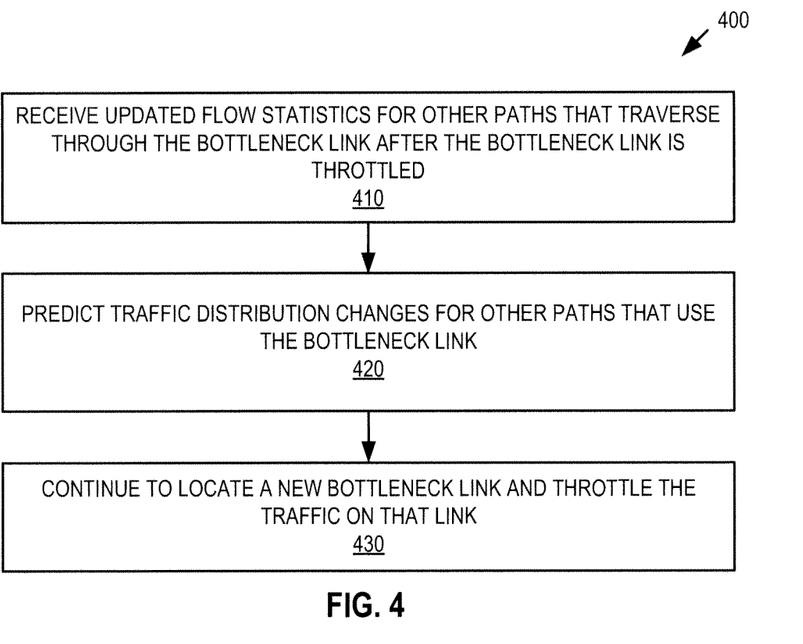
FIG. 4 is a flow diagram illustrating an embodiment of a method for updating statistics after a bottleneck link is throttled.

After the throttling policy is constructed and sent to the ingress switch, the congestion condition on other paths in the network may also change. FIG. 4 illustrates an embodiment of a method 400 that updates the statistics of other paths. In one embodiment, the method 400 is performed by a controller, such as the controller 110 of FIG. 1.

In one embodiment, after the bottleneck link is throttled according to the method 300 described above, the controller 110 receives updated flow statistics for other paths that traverse through the bottleneck link (block 410). The controller 110 predicts traffic distribution changes for these other paths (block 420). The controller 110 then continues to locate a new bottleneck link and throttles the traffic on that link (block 430); for example, by using the method 300 described above.

Figure 5:
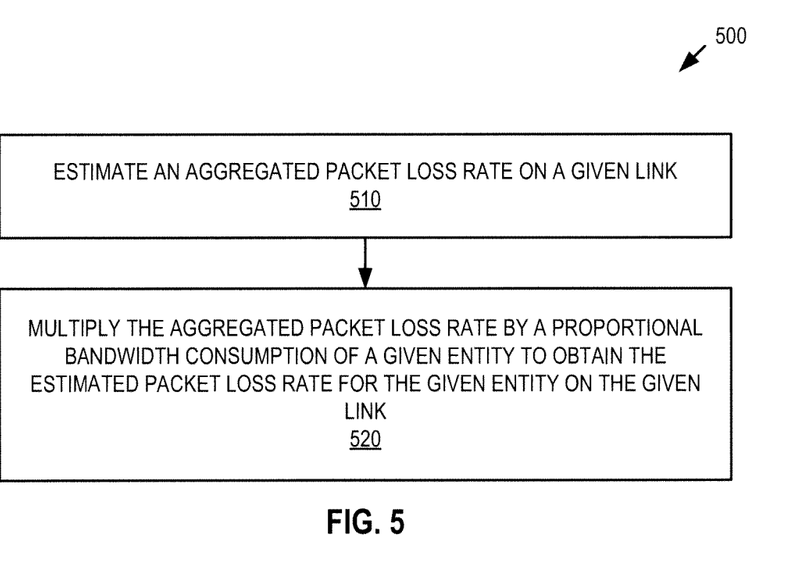
FIG. 5 is a flow diagram illustrating an embodiment of a method for estimating a packet loss rate.

FIG. 5 illustrates one embodiment of a method 500 for calculating packet loss rate for an entity. In one embodiment, the method 500 is performed by a controller of a split architecture network, such as the controller 110 of FIG. 1.

In one embodiment, the controller 110 estimates an aggregated packet loss rate on a given link (block 510). The packet loss rate can be estimated based on the data collected by the switches. Typically a switch collects traffic statistics such as the number of packets received for each flow in its ingress queue. Packet drops can occur in the ingress queue, egress queue and the switching fabric of a switch. In some embodiments, the output port of a switch may be able to record the number of packet drops in the output queue, to thereby generate the aggregated packet loss L on a given link for all of the entities that use that link.

In some alternative embodiments, the switch cannot support counting the packet drops at the aggregate level. In these alternative embodiments, the controller 110 can compute the packet loss rate based on the ingress statistics of two consecutive switches for the same flow on a path. For example, consider a flow that traverses Switch S1 and then Switch S2. Switch S1 records C1 packet arrivals and switch S2 records C2 arrivals. When both numbers are sent to the controller 110, assuming the two switches are well synchronized, the controller 110 can estimate the drops as C2-C1. It is understood that the accuracy of the estimation can be affected by the time synchronization and the sampling errors.

After estimating the aggregate packet loss rate, the controller 110 multiplies the aggregated packet loss rate by a proportional bandwidth consumption of an entity to obtain the estimated packet loss rate for that entity on the given link (block 520). For example, the packet loss rate for entity i based on its proportional bandwidth sharing can be estimated as:

$$Li = L \times (Bi / \Sigma B).$$

As described above in connection with FIG. 3, Li and Bi are used by the controller 110 to identify the most congested link in the network. The following describes the use of Li and Bi for calculating throttling probabilities.

Figure 6:
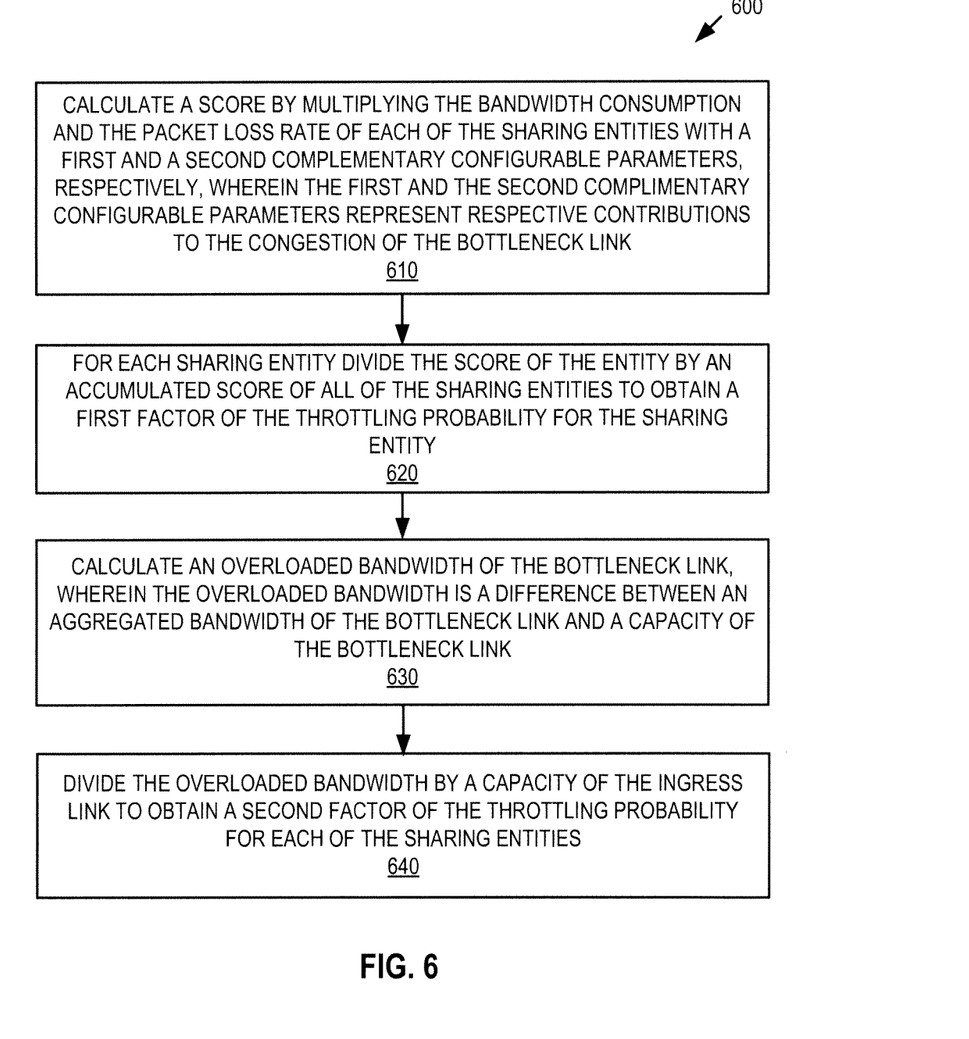
FIG. 6 is a flow diagram illustrating an embodiment of a method for calculating a throttling probability.

FIG. 6 illustrates one embodiment of a method 600 for calculating throttling probabilities. In one embodiment, the method 600 is performed by a controller of a split architecture network, such as the controller 110 of FIG. 1.

In one embodiment, the controller 110 calculates a score by multiplying the bandwidth consumption $B_i^t$ and the packet loss rate $L_i^t$ of each sharing entity with a first and a second complementary configurable parameters, respectively (block 610). The first and the second complimentary configurable parameters (e.g., $\mu$ and $\beta$) represent respective contributions of $B_i^t$ and $L_i^t$ to the congestion of the bottleneck link. More specifically, for each sharing entity, a score is calculated to summarize the bandwidth and the packet loss rate of this entity. In one embodiment, the score is defined and calculated as: $m_i^t = \mu B_i^t + \beta L_i^t$.

The parameters $\mu$ and $\beta$ are two configurable parameters that account for the trade-offs between the two metrics of $B_i^t$ and $L_i^t$. One reason for considering both $B_i^t$ and $L_i^t$ is to capture the congestion caused by transient bursty flows. For example, suppose that flow 1 and flow 2 have the same bandwidth over a monitored period T. However, flow 2 is much more bursty than flow 1 and the bursts can cause transient congestion to occur. Thus, even though their bandwidth over time T is the same, flow 2 causes more packet loss than flow 1. That is, $L_1 < L_2$, which suggests that flow 2 causes more congestion on the link.

In one embodiment, the throttling is performed on the ingress hop (i.e., the ingress link) of the target path to improve efficiency. Assume that the ingress link's bandwidth is $C_{in}$. The throttling probability for entity i among the n sharing entities is a product of a first factor and a second factor, where the first factor is the result of dividing the score of the entity by an accumulated score of all of the sharing entities (block 620). In one embodiment, the first factor is defined as: $m_i^t / \Sigma_{i=1}^n m_i^t$.

To calculate the second factor, an overloaded bandwidth of the bottleneck link is first calculated. The overloaded bandwidth is the difference between an aggregated bandwidth of the bottleneck link and the capacity of the bottleneck link (block 630). More specifically, assume that n entities are sharing the target path, and the link capacity of the bottleneck link is $C_b$. The overloaded bandwidth is: $C' = \Sigma_{i=1}^n B_i - C_b$.

The second factor for entity i is then calculated by dividing the overloaded bandwidth by the capacity of the ingress link (block 640). That is, the throttling probability for entity i is:

$$P_i = (m_i^t / \Sigma_{i=1}^n m_i^t) \times ((\Sigma_{i=1}^n B_i - C_b) / C_{in}).$$

In the example of FIG. 6, the first factor is calculated prior to the second factor. It is understood that the two factors can be calculated in any order or in parallel.

Figure 7:
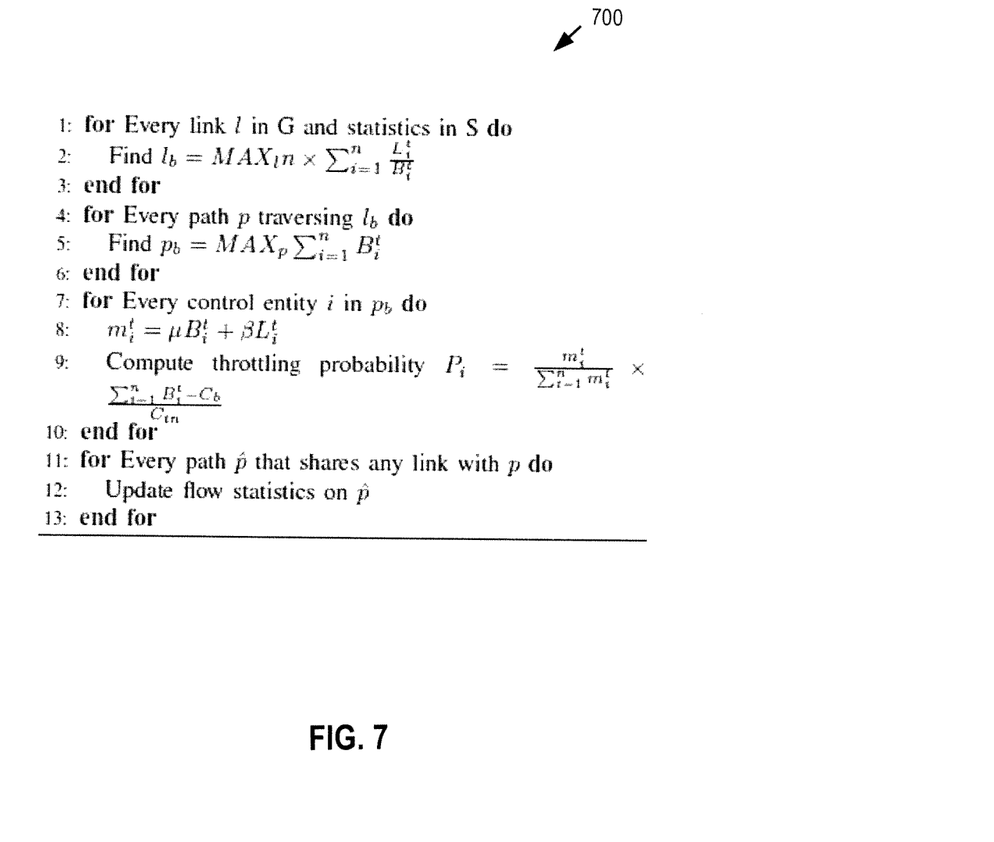
FIG. 7 is a diagram that summaries the embodiments described in FIGS. 3-6.

FIG. 7 is a diagram that summarizes the operations of the controller 110 described above in FIGS. 3-6.

The operations of the diagrams of FIGS. 3-7 have been described with reference to the exemplary embodiments of FIG. 1 and FIG. 2. However, it should be understood that the operations of the diagrams of FIGS. 3-7 can be performed by embodiments of the invention other than those discussed with reference to FIG. 1 and FIG. 2, and the embodiments discussed with reference to FIG. 1 and FIG. 2 can perform operations different than those discussed with reference to the diagrams of FIGS. 3-7. While the diagrams of FIGS. 3-7 show a particular order of operations performed by certain embodiments of the invention, it should be understood that such order is exemplary (e.g., alternative embodiments may perform the operations in a different order, combine certain operations, overlap certain operations, etc.).

Different embodiments of the invention may be implemented using different combinations of software, firmware, and/or hardware. Thus, the techniques shown in the figures can be implemented using code and data stored and executed on one or more electronic devices (e.g., an end station, a network element). Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable transmission media (e.g., electrical, optical, acoustical or other form of propagated signals—such as carrier waves, infrared signals, digital signals). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). Thus, the storage device of a given electronic device typically stores code and/or data for execution on the set of one or more processors of that electronic device.

As used herein, a network element (e.g., a router, switch, bridge, controller) is a piece of networking equipment, including hardware and software, that communicatively interconnects other equipment on the network (e.g., other network elements, end stations). Some network elements are "multiple services network elements" that provide support for multiple networking functions (e.g., routing, bridging, switching, Layer 2 aggregation, session border control, Quality of Service, and/or subscriber management), and/or provide support for multiple application services (e.g., data, voice, and video). Subscriber end stations (e.g., servers, workstations, laptops, netbooks, palm tops, mobile phones, smartphones, multimedia phones, Voice Over Internet Protocol (VOIP) phones, user equipment, terminals, portable media players, GPS units, gaming systems, set-top boxes) access content/services provided over the Internet and/or content/services provided on virtual private networks (VPNs) overlaid on (e.g., tunneled through) the Internet. The content and/or services are typically provided by one or more end stations (e.g., server end stations) belonging to a service or content provider or end stations participating in a peer to peer service, and may include, for example, public webpages (e.g., free content, store fronts, search services), private webpages (e.g., username/password accessed webpages providing email services), and/or corporate networks over VPNs. Typically, subscriber end stations are coupled (e.g., through customer premise equipment coupled to an access network (wired or wirelessly)) to edge network elements, which are coupled (e.g., through one or more core network elements) to other edge network elements, which are coupled to other end stations (e.g., server end stations).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method for network-wide congestion control performed by a network element functioning as a controller in a split architecture network, the network comprising a set of switches and a set of links with each of the links connecting to two of the switches, wherein each of the switches forwards flows and collects flow statistics as directed by the controller, and wherein the flows traverse across the network via their respective paths formed by the links, the method comprising the steps of:

receiving by the controller flow statistics from the switches for each of a set of entities that communicate via the network, wherein each of the entities is identified as one or more of the flows that traverse a same path in the network;

choosing a most congested link as a bottleneck link of the network based on a packet loss rate that is derived from the flow statistics and estimated for each of the entities on each of the links;

identifying one of the paths as a target path, which passes through the bottleneck link and carries the most traffic;

calculating a throttling probability for each of a set of sharing entities, based on a capacity of the bottleneck link, a capacity of an ingress link that is a first link of the target path, bandwidth consumption and the packet loss rate of each of the sharing entities, wherein the sharing entities are the entities that share the target path; and transmitting the throttling probability of each of the sharing entities to the ingress switch of the target path to thereby drop packets and to reduce the congestion on the bottleneck link in the network.

2. The method of claim 1, wherein the step of choosing further comprises the step of:

estimating an aggregated packet loss rate on a given one of the links; and multiplying the aggregated packet loss rate by a proportional bandwidth consumption of a given one of the entities to obtain the estimated packet loss rate for the given entity on the given link.

3. The method of claim 2, wherein the step of estimating further comprises the step of receiving the number of packet drops collected in an output queue at the switches connecting to the given link.

4. The method of claim 2, wherein the step of estimating further comprises the step of computing a difference between ingress statistics collected at the switches connecting to the given link.

5. The method of claim 1, wherein the bandwidth consumption of each of the sharing entities is collected from the ingress switch of the target path.

6. The method of claim 1, wherein the bandwidth consumption and the packet loss rate of each of the sharing entities is updated with an exponentially weighted moving average that incorporates historical information and current information.

7. The method of claim 1, wherein the step of choosing further comprises the step of choosing one of the links that has the most relative packet loss rate as the bottleneck link, wherein the relative packet loss rate is measured by the number of dropped packets divided by the number of successfully delivered packets.

8. The method of claim 1, wherein the step of choosing further comprises the step of choosing one of the links that affects the most entities as the bottleneck link, wherein the number of affected entities is measured by the number of dropped packets divided by the number of successfully delivered packets, multiplied by a total number of entities sharing the one of the links.

9. The method of claim 1, wherein the step of calculating further comprises the step of:

calculating a score by multiplying the bandwidth consumption and the packet loss rate of each of the sharing entities with a first and a second complementary configurable parameters, respectively, wherein the first and the second complimentary configurable parameters represent respective contributions to the congestion of the bottleneck link; and dividing, for each of the sharing entities, the score of the entity by an accumulated score of all of the sharing entities to obtain a first factor of the throttling probability for the sharing entity.

10. The method of claim 1, wherein the step of calculating further comprises the step of:

calculating an overloaded bandwidth of the bottleneck link, wherein the overloaded bandwidth is a difference between an aggregated bandwidth of the bottleneck link and a capacity of the bottleneck link; and dividing the overloaded bandwidth by a capacity of the ingress switch to obtain a second factor of the throttling probability for each of the sharing entities.

11. A network element functioning as a controller in a split architecture network for network-wide congestion control, the network comprising the controller, a set of switches and a set of links with each of the links connecting to two of the switches, wherein each of the switches forwards flows and collects flow statistics as directed by the controller, and wherein the flows traverse across the network via their respective paths formed by the links, the network element comprising:

memory to store flow statistics for each of a set of entities that communicate via the network, wherein each of the entities is identified as one or more of the flows that traverse a same path in the network;

a network interface to receive the flow statistics from the switches; and a processor coupled to the memory, the processor adapted to choose a most congested link as a bottleneck link of the network based on a packet loss rate that is derived from the flow statistics and estimated for each of the entities on each of the links, to identify one of the paths as a target path, which passes through the bottleneck link and carries the most traffic, to calculate a throttling probability for each of a set of sharing entities, which are the entities that share the target path, wherein the throttling probability is calculated based on a capacity of the bottleneck link, a capacity of an ingress one of the switches that is a first link of the target path, bandwidth consumption and the packet loss rate of each of the sharing entities, and to transmit the throttling probability of each of the sharing entities to the ingress switch of the target path to thereby drop packets and to reduce the congestion on the bottleneck link in the network.

12. The network element of claim 11, wherein the processor is further adapted to estimate an aggregated packet loss rate on a given one of the links and to multiply the aggregated packet loss rate by a proportional bandwidth consumption of a given one of the entities to obtain the estimated packet loss rate for the given entity on the given link.

13. The network element of claim 12, wherein the processor is further adapted to receive the number of packet drops collected in an output queue at the switches connecting to the given link.

14. The network element of claim 12, wherein the processor is further adapted to compute a difference between ingress statistics collected at the switches connecting to the given link.

15. The network element of claim 11, wherein the bandwidth consumption of each of the sharing entities is collected from the ingress switch of the target path.

16. The network element of claim 11, wherein the bandwidth consumption and the packet loss rate of each of the sharing entities is updated with an exponentially weighted moving average that incorporates historical information and current information.

17. The network element of claim 11, wherein the processor is further adapted to choose one of the links that has the largest amount of relative packet loss rate as the bottleneck link, wherein the relative packet loss rate is measured by the number of dropped packets divided by the number of successfully delivered packets.

18. The network element of claim 11, wherein the processor is further adapted to choose one of the links that affects the largest number of entities as the bottleneck link, wherein the number of affected entities is measured by the number of dropped packets divided by the number of successfully delivered packets, multiplied by a total number of entities sharing the one of the links.

19. The network element of claim 11, wherein the processor is further adapted to calculate a score by multiplying the bandwidth consumption and the packet loss rate of each of the sharing entities with a first and a second complementary configurable parameters, respectively, wherein the first and the second complimentary configurable parameters represent respective contributions to the congestion of the bottleneck link, and to divide, for each of the sharing entities, the score of the entity by an accumulated score of all of the sharing entities to obtain a first factor of the throttling probability for the sharing entity.

20. The network element of claim 11, wherein the processor is further adapted to calculate an overloaded bandwidth of the bottleneck link, wherein the overloaded bandwidth is a difference between an aggregated bandwidth of the bottleneck link and a capacity of the bottleneck link, and to divide the overloaded bandwidth by a capacity of the ingress switch to obtain a second factor of the throttling probability for each of the sharing entities.

* * * * *